United States Patent
Wilkendorf

(10) Patent No.: US 7,591,490 B1
(45) Date of Patent: Sep. 22, 2009

(54) COUPLING DEVICE FOR THE QUICK-RELEASE COUPLING OF HOSE-LIKE OR TUBULAR PIPES TO A CONNECTING PART

(75) Inventor: Werner Wilkendorf, Ottweiler (DE)

(73) Assignee: Hydac Filtertechnik GmbH, Sulzbach (DE)

( * ) Notice: Subject to any disclaimer, the term of this patent is extended or adjusted under 35 U.S.C. 154(b) by 0 days.

(21) Appl. No.: 09/958,180

(22) PCT Filed: Dec. 22, 1999

(86) PCT No.: PCT/EP99/10264

§ 371 (c)(1),
(2), (4) Date: Dec. 7, 2001

(87) PCT Pub. No.: WO00/61983

PCT Pub. Date: Oct. 19, 2000

(30) Foreign Application Priority Data

Apr. 14, 1999 (DE) ................ 199 16 824

(51) Int. Cl.
*F16L 17/00* (2006.01)
(52) U.S. Cl. ..................... 285/368; 285/412
(58) Field of Classification Search .......... 285/205, 285/139.1, 331, 363, 368, 148.28, 211, 212, 285/349, 356, 336, 414, 412
See application file for complete search history.

(56) References Cited

U.S. PATENT DOCUMENTS

| | | | | |
|---|---|---|---|---|
| 442,947 A | * | 12/1890 | Bowers | 285/336 |
| 924,039 A | * | 6/1909 | Clark | 285/336 |
| 1,258,166 A | * | 3/1918 | Vollmann | 285/414 |
| 1,468,187 A | * | 9/1923 | Werbeck | 285/414 |
| 2,139,125 A | * | 12/1938 | Hixon | 285/114 |
| 2,464,744 A | | 3/1949 | Fennema | |
| 2,681,817 A | * | 6/1954 | Demlow | 403/262 |
| 2,749,149 A | * | 6/1956 | Carpenter | 285/189 |
| 3,292,955 A | * | 12/1966 | Luther | 285/261 |
| 3,332,709 A | * | 7/1967 | Kowalski | 285/23 |
| 3,600,012 A | | 8/1971 | Stafford | |
| 3,764,170 A | * | 10/1973 | Brown | 285/412 |
| 4,426,103 A | * | 1/1984 | Sundholm | 285/12 |

(Continued)

FOREIGN PATENT DOCUMENTS

FR 668578 11/1929

(Continued)

*Primary Examiner*—Aaron M Dunwoody
(74) *Attorney, Agent, or Firm*—Roylance, Abrams, Berdo & Goodman, L.L.P.

(57) ABSTRACT

A coupling device provides a quick-release coupling of hose-like or tubular pipes to a connecting part at an outlet for a pressurized fluid. The connecting part has a locating face against which the end face of a flange positioned at the end of the pipe can be pressed by means of clamping screws. A sealing element is held between the flange and locating face. The clamping screws are anchored in the connecting part. The locating face of the connecting part is embodied by the base of a recess surrounding the outlet. The flange, at the end of the pipe, is housed in the recess such that the edge of the recess secures the flange against radial displacement. The clamping screws directly cooperate with the face of the flange opposite the end face.

28 Claims, 2 Drawing Sheets

U.S. PATENT DOCUMENTS

| | | | |
|---|---|---|---|
| 4,582,089 A * | 4/1986 | Nimberger | 285/414 |
| 4,977,917 A * | 12/1990 | Adams | 285/336 |
| 5,000,488 A * | 3/1991 | Albrecht | 285/12 |
| 5,018,769 A * | 5/1991 | Albrecht | 285/39 |
| 5,779,280 A * | 7/1998 | Hedman | 285/124.4 |
| 5,829,794 A * | 11/1998 | Schulz-Hausmann et al. | 285/205 |
| 6,467,820 B1 * | 10/2002 | Albrecht et al. | 285/368 |

FOREIGN PATENT DOCUMENTS

| | | | | |
|---|---|---|---|---|
| GB | 1480 | * | 0/1877 | 285/412 |
| GB | 5909 | * | 0/1893 | 285/414 |
| GB | 11956 | * | 0/1891 | 285/412 |
| JP | 07042885 | | 2/1995 | |
| WO | WO 9853176 A2 | * | 11/1998 | |

* cited by examiner

COUPLING DEVICE FOR THE QUICK-RELEASE COUPLING OF HOSE-LIKE OR TUBULAR PIPES TO A CONNECTING PART

FIELD OF THE INVENTION

The present invention relates to a coupling device for a quick-release coupling of hose-like or tubular pipes with a connecting part at an outlet for a pressurized fluid. A contacting surface is provided on the connecting part, onto which the end face of a flange arranged on the end of the pipe can be pressed. A sealing element can be interposed on the connecting port and flange and pressed by clamping screws anchored on the connecting part.

BACKGROUND OF THE INVENTION

Coupling devices are known and are commercially available in a standard embodiment, as disclosed, for example, in the specification for the American SAE-Standard J518, revised wording of June 1993.

The clamping screws, provided for the pressing of the pipe-end flange on the contacting face of the connecting part in the case of the known coupling device, extend through bores in two clamping jaws. These clamping jaws have each the shape of a half-ring. Each one surrounds one half of the periphery of the end flange found on the pipe. Each of these half-rings is supported on the surface of the flange opposite the end face. When the coupling device is in assembled state, the two half-rings form a closed flange ring, which encloses the end flange on the pipe. The bores for the clamping screws are arranged diametrically opposite one another in pairs in the four corner areas of this flange ring formed by the half-rings of the clamping jaws.

The known clamping devices, on account of the clamping jaws forming the exterior flange ring, are not only bulky, but on account of the number of structural parts required are expensive to manufacture. One particular drawback is in that the assembly process for the known coupling devices is difficult and time-consuming. To produce the screwing together during the assembly, it is necessary to lay out the end face of the flange adjacent to the pipe on the contact surface on the connecting part and simultaneously to hold the two clamping jaws on the end flange of the pipe engaging in such a position that the bores for the clamping screws are aligned with associated threaded bores in the connecting part. These processes can be executed by one single assembly person only with considerable difficulty.

With a coupling device as found in FR 668,578 A, for simplification of the assembly, the contacting surface of the connecting part is formed by the base of a recess surrounding its outlet. The end flange of the pipe can be received so that the border of the recess forms a secure fixing against displacement of the flange in radial direction. However, a ring or half-ring is likewise required to enclose the flange on the pipe.

SUMMARY OF THE INVENTION

Objects of the present invention are to provide an improved coupling device having a simple construction and correspondingly low manufacturing costs, and allowing a simplification of the assembly process.

These objects are attained by a coupling device having clamping screws cooperating directly with the surface of the flange of the pipe facing the end surface. Additional flange rings or parts of flange rings can be deleted. One advantage is a compact structure. Second, because of the lower number of structural parts, the manufacturing costs are lowered. With the lower number of structural parts, fewer parts are to be handled for assembly, thus remarkably simplifying the assembly process.

The end flange of the pipe on the connecting part is likewise ensured against radial displacement. An exterior enclosing of the end flange of the pipe by clamping jaws, which form an exterior, surrounding flange ring, is not required. The bearing pressure can then be exerted through the clamping screws directly over the end flange of the pipe such that the clamping jaws can be deleted. As a result of the recess formed in the connecting part as a seat for the end flange of the pipe, the connecting part in turn forms the secure fixing against displacement of the flange in radial direction.

The device according to the present invention is also suitable for the coupling of those hose-like or tubular pipes which are provided with a tapered screw connection. In this case, the flange received in the recess of the connecting part is provided on a tubular member serving as adapter. The tubular member can be connected at its end more distant from the flange with the relevant pipe, by means of the tapered screw connection.

Other objects, advantages and salient features of the present invention will become apparent from the following detailed description, which, taken in conjunction with the annexed drawings, discloses preferred embodiments of the present invention.

BRIEF DESCRIPTION OF THE DRAWINGS

Referring to the drawings which form a part of this disclosure.

DETAILED DESCRIPTION OF THE INVENTION

Figure 1:
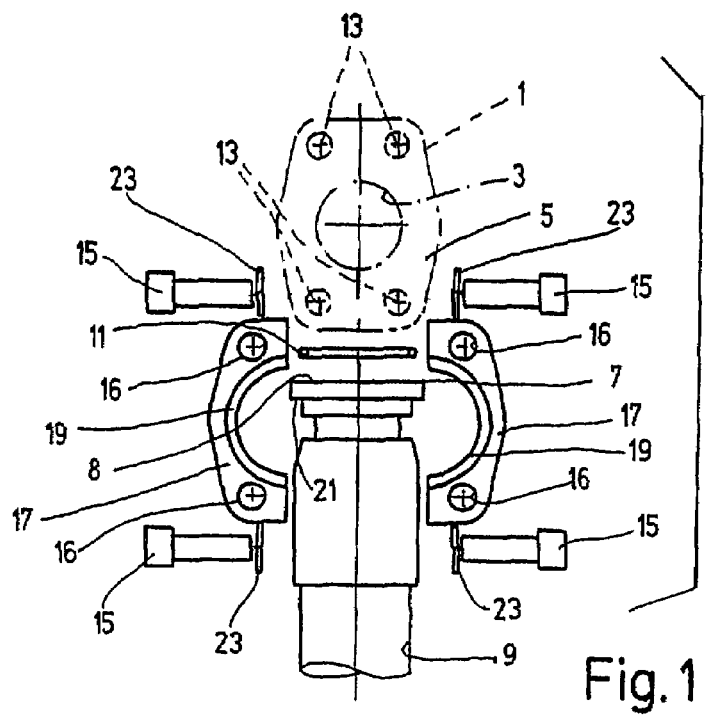
FIG. 1 is an exploded, side elevational view of a conventional coupling device with the connecting part shown with broken lines and rotated through a 90° angle.

FIG. 1 shows a conventional coupling device configured according to American SAE-Standard J518 (revised wording of June 1993), in which the connecting part 1 is indicated with a broken line. Connecting part 1 includes a planar contacting surface 5 surrounding its central outlet 3. A flange 7 forms the front connecting end of a hose-like pipe 9, and can be pressed with its planar front end surface 8. In end surface 8, a recess is configured in the form of an annular groove, not shown in FIG. 1, and receives a sealing element in the form of an O-ring 11.

Connecting part 1 includes four threaded bores 13 arranged diametrically opposite one another in pairs. Clamping screws 15 can be threaded into bores 13 and can engage through bores 16 in two identically configured clamping jaws 17.

FIG. 1 shows the conventional coupling device in a taken apart or exploded state. Each clamping jaw 17 forms one half of a flange ring, which becomes a complete ring when the two clamping jaws 17 are mounted on the periphery of flange 7 of pipe 9. A semi-circular shoulder surface 19 on the interior border of each clamping jaw 17 engages on the rear surface 21 of flange 7, opposite to end surface 8. In this manner, clamping jaws 17, together with clamping screws 15, are screwed through the through bores 16 in such a manner that their screw heads are supported by spring plates 23 on clamping jaws 17. By screwing with threaded bores 13, a clamping arrangement is formed which produces the required pressure between contacting surface 5 on connecting part 1 and end surface 8 on flange 7. Simultaneously, the clamping jaws 17, serving as border enclosing wall of flange 7, secure this member against radial displacement relative to the axis of outlet 3.

Figure 2:
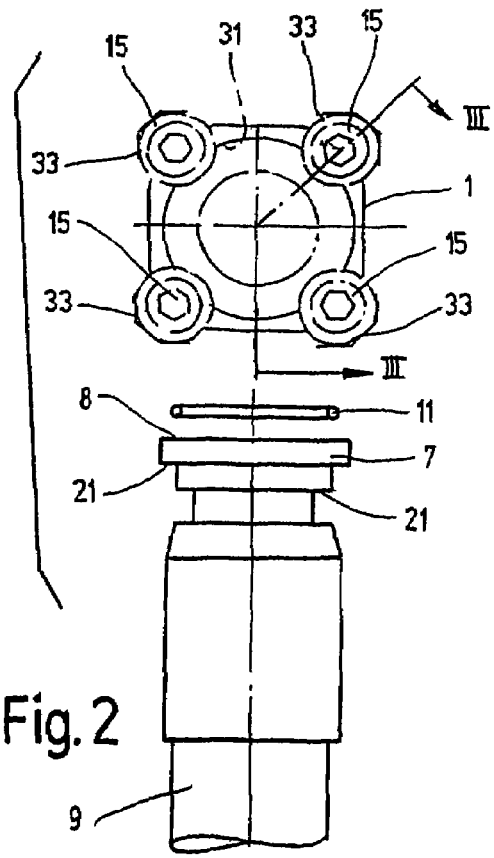
FIG. 2 is an exploded, side elevational view of a coupling device according to a first embodiment of the invention, with the connecting part shown in broken lines and rotated through a 90° angle and with the clamping jaws and screws rotated through a 90° angle.
Figure 3:
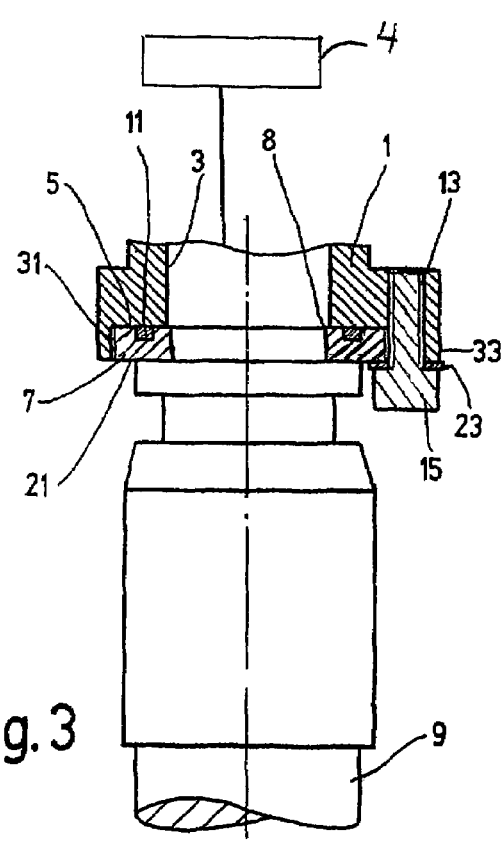
FIG. 3 is an enlarged side elevational view of the coupling device of FIG. 2 in an assembled state, partially in section with the connecting part and associated end part of the connecting pipe assemble taken generally along line III-III of FIG. 2.

FIGS. 2 and 3 show a first embodiment of the coupling device according to the present invention. As is clear in FIG. 3, the front end or contacting surface of connecting part 1 is not formed as a planar surface passing therethrough, as is the case in the conventional coupling device of FIG. 1. Rather, the contacting surface 5, on which is pressed the end surface 8 of end flange 7 of pipe 9, is formed by the base of the recess 31 formed in the front end of connecting part 1. The recess concentrically surrounds outlet 3, with outlet 3 leading to a filter housing 4 of a fluid-technology installation.

As is shown in FIG. 2, connecting part 1 is essentially quadratic in its overall contour. The four corner areas in turn incorporate four circularly curved enlarged areas 33 arched outwardly toward the exterior. In the center of curvature of enlarged areas 33, threaded bores 13 are provided, as shown in FIG. 3. In each corner area of connecting part 1, clamping screws 15 can be screwed into the threaded bores. The screw heads overlap and work or apply force directly through spring washers 23 on the rear surface 21 of flange 7, which flange rests in recess 31. As is clear in the drawing, the radius of the circular curve or curvature of each of the enlarged areas 33 corresponds essentially to the radius of the head of a clamping screw 15, so that the screw heads essentially fit the contour of connecting part 1. The screws directly engage spring washers 23 that in turn directly engage a rear surface of end flange 7 fixed on the end of pipe 9. It is to be understood that the screwing arrangement also could be constructed so that nuts, which rest on threaded bolts anchored in connecting part 1, could cooperate with rear surface 21 of flange 7.

Since the exterior border of recess 31 forms a side binding wall of flange 7 of pipe 9, the seat in connecting part 1 fixes the position of the flange from the side. The transverse forces exerted through the side fixing of the position or bearing of clamping screws 15 on flange 7 cannot cause the displacement movement of flange 7 to occur either transversally or radially. Despite the abandonment of the use of separate clamping jaws around the sides of flange 7, an operationally reliable coupling connection is guaranteed.

Figure 4:
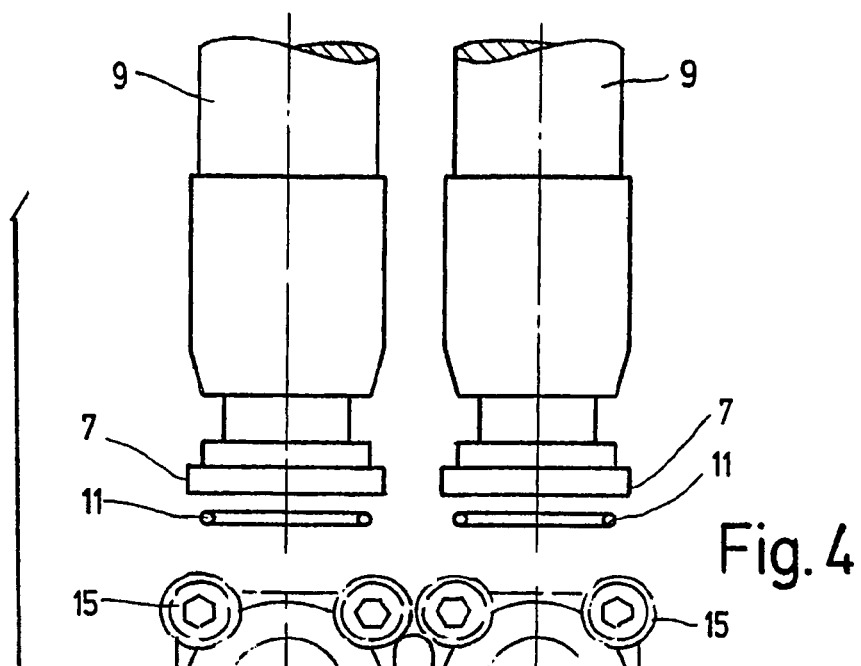
FIG. 4 is a side elevational view, similar to that of FIG. 2, of a coupling device according to a second embodiment of the present invention, with connecting parts constructed one adjacent to the other for the formation of a double connection and illustrated in broken lines and rotated through a 90° angle.

With the abandonment of bulky, exterior clamping jaws, the coupling device of the present invention can be designed as a compact multiple-part connection arrangement, for example, a type of double connection 41 as shown in FIG. 4. The two connecting parts 1 are aligned directly bordering one another with their corner areas. With such an embodiment, in which two pairs of clamping screws 15 with their heads closely adjacent to one another are provided. For allowing easy and reliable assembly, the screw heads are provided an interior hexagonal shape. Space-saving multiple auxiliary connections are advantageously used in the case of compact fluid-technology installations, for example, with filter housings having sealed fluid passages arranged one adjacent to the other, for example for the simultaneous feed and discharge of a medium while being used.

Figure 5:
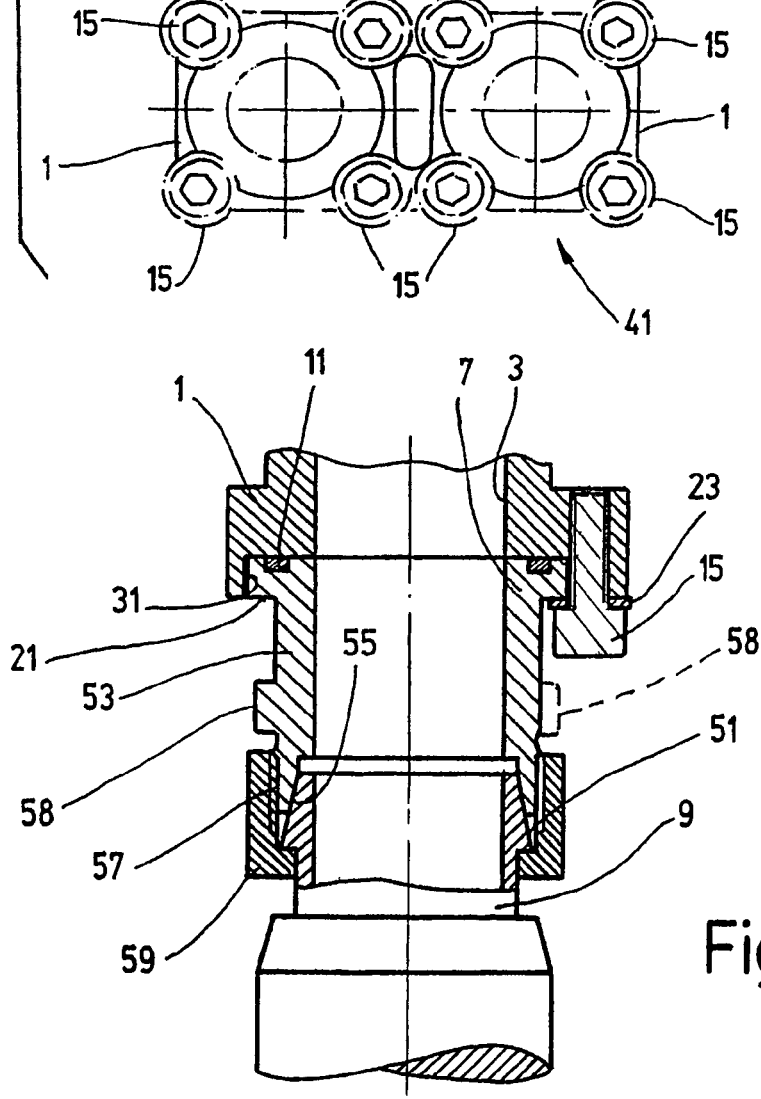
FIG. 5 is a side elevational view in section of a coupling device according to a third embodiment of the present invention for coupling of pipes using a tapered screw connection.

FIG. 5 shows one exemplary embodiment for the connection of a pipe 9. Instead of an end flange, a tapered connection 51 for a tapered screw connection is provided. The flange 7, received in recess 31 of connecting part 1 in this case, is located on a tubular member 53, serving as adapter. The adapter end opposite flange 7 has an interior cone shape 55 and an exterior threading 57. In cooperation with a screw cap 59, threading 57 produces a tapered screw connection with pipe 9. To prevent rotation during assembly, tubular member 53, in its peripheral area located between flange 7 and cone 55, is provided with planar key faces 58 for engaging a tool. Also, with this embodiment, the cooperation between end flange 7 of tubular member 53 serving as an adapter and connecting part 1 occurs in the same manner as described above, in other words by direct cooperation of clamping screws 15 with rear surface 21 of flange 7.

While various embodiments have been chosen to illustrate the invention, it will be understood by those skilled in the art that various changes and modifications can be made therein without departing from the scope of the invention as defined in the appended claims.

What is claimed is:

1. A coupling device for a quick-release connection of a pipe with an outlet for a pressurized medium, comprising:

a connecting part having an outlet, a contracting surface thereon and a quadratic periphery with outwardly and circularly curved corners forming an outwardly arched enlarged area at each of said corners, said contacting surface having a recess with a base and a border surrounding said outlet, each of said corners having a threaded bore;

an end flange fixed on an end of a pipe, said end flange having an end surface and a peripheral face and being received in said recess with said end face engaging said base and with said peripheral face engageable with said border to protect against radial displacement of said end flange;

clamping screws anchored on said connecting part and directly engaging spring washers that directly engage a rear surface of said end flange opposite said end surface to press said end surface against said base, each said threaded bore receiving one of said clamping screws and positioned relative to said recess such that said peripheral face at said end flange overlaps one of a head and a nut on each of said clamping screws; and a sealing element interposed between said end flange and said base.

2. A coupling device according to claim 1 wherein
said recess is concentric with said outlet; and
said end flange is circular.

3. A coupling device according to claim 1 wherein
said threaded bores are concentric with curvatures of said curved corners; and
each of said curved corners has a radius of curvature corresponding essentially to a radius of each said head.

4. A coupling device according to claim 1 wherein
said sealing element comprises an O-ring fitted in an annular groove in said end surface of said end flange.

5. A coupling device according to claim 1 wherein
said end flange is mounted on a tubular adapter connected with said pipe by a tapered screw connection.

6. A coupling device according to claim 1 wherein
said outlet leads to a filter housing of a fluid-technology installation.

7. A coupling device according to claim 1 wherein
said recess concentric with said outlet; and
said flange is circular.

8. A coupling device for a quick-release connection of a pipe with an outlet for a pressurized medium, comprising:
a connecting part having an outlet and a contracting surface thereon, said contacting surface having a recess with a base and a border surrounding said outlet;
an end flange fixed on an end of a pipe by being mounted on a tubular adapter connected with said pipe by a tapered screw connection, said end flange having an end surface and a peripheral face and being received in said recess with said end face engaging said base and with said peripheral face engageable with said border to protect against radial displacement of said end flange;
clamping screws anchored on said connecting part and directly engaging spring washers that directly engage a rear surface of said end flange opposite said end surface to press said end surface against said base; and
a sealing element interposed between said end flange and said base.

9. A coupling device according to claim 8 wherein
said recess is concentric with said outlet; and
said end flange is circular.

10. A coupling device according to claim 8 wherein
said connecting part has a quadratic periphery with outwardly and circularly curved corners forming an outwardly arched enlarged area at each of said corners, each of said enlarged areas having a threaded bore receiving one of said clamping screws and positioned relative to said recess such that said peripheral face at said end flange overlaps one of a head and a nut on each of said clamping screws;
said threaded bores are concentric with curvatures of said curved corners; and
each of said curved corners has a radius of curvature corresponding essentially to a radius of each said head.

11. A coupling device according to claim 8 wherein
said sealing element comprises an O-ring fitted in an annular groove in said end surface of said end flange.

12. A coupling device according to claim 8 wherein
said outlet leads to a filter housing of a fluid-technology installation.

13. A coupling device for a quick-release connection of a pipe with an outlet for a pressurized medium, comprising:
a connecting part having an outlet and a contracting surface thereon, said contacting surface having a recess with a base and a border surrounding said outlet;
an end flange fixed on an end of a pipe, said end flange having an end surface and a peripheral face and being received in said recess with said end face engaging said base and with said peripheral face engageable with said border to protect against radial displacement of said end flange;
clamping screws anchored on said connecting part and directly engaging spring washers that directly engage a rear surface of said end flange opposite said end surface to press said end surface against said base; and
a sealing element interposed between said end flange and said base and including an O-ring fitted in an annular groove is said end face of said end flange.

14. A coupling device according to claim 13 wherein
said recess is concentric with said outlet; and
said end flange is circular.

15. A coupling device according to claim 13 wherein
said connecting part has a quadratic periphery with outwardly and circularly curved corners forming an outwardly arched enlarged area at each of said corners, each of said enlarged areas having a threaded bore receiving one of said clamping screws and positioned relative to said recess such that said peripheral face at said end flange overlaps one of a head and a nut on each of said clamping screws;
said threaded bores are concentric with curvatures of said curved corners; and
each of said curved corners has a radius of curvature corresponding essentially to a radius of each said head.

16. A coupling device according to claim 13 wherein
said outlet leads to a filter housing of a fluid-technology installation.

17. A coupling device according to claim 13 wherein
each said screw comprises a head, a shank extending from said head and a washer mounted on said shank adjacent said head.

18. A coupling device for a quick-release connection of a pipe with an outlet for a pressurized medium, comprising:
a connecting part having an outlet, a contracting surface thereon and a quadratic periphery with outwardly and circularly curved corners forming an outwardly arched enlarged area at each of said corners, said contacting surface having a recess with a base and a border surrounding said outlet, each of said corners having a threaded bore;
an end flange fixed on an end of a pipe, said end flange having an end surface and a peripheral face and being received in said recess with said end face engaging said base and with said peripheral face engageable with said border to protect against radial displacement of said end flange;
clamping screws anchored on said connecting part and cooperating with a rear surface of said end flange opposite said end surface to press said end surface against said base, each said threaded bore receiving one of said clamping screws and positioned relative to said recess such that said peripheral face at said end flange overlaps one of a head and a nut on each of said clamping screws; and
a sealing element interposed between said end flange and said base.

19. A coupling device according to claim 18 wherein
said threaded bores are concentric with curvatures of said curved corners; and
each of said curved corners has a radius of curvature corresponding essentially to a radius of each said head.

20. A coupling device according to claim 18 wherein
said sealing element comprises an O-ring fitted in an annular groove in said end surface of said end flange.

21. A coupling device according to claim 18 wherein
said end flange is mounted on a tubular adapter connected with said pipe by a tapered screw connection.

22. A coupling device according to claim 18 wherein
said outlet leads to a filter housing of a fluid-technology installation.

23. A coupling device for a quick-release connection of a pipe with an outlet for a pressurized medium, comprising:
a connecting part having an outlet and a contracting surface thereon, said contacting surface having a recess with a base and a border surrounding said outlet;
an end flange fixed on an end of a pipe by being mounted on a tubular adapter connected with said pipe by a tapered screw connection, said end flange having an end surface and a peripheral face and being received in said recess with said end face engaging said base and with said peripheral face engageable with said border to protect against radial displacement of said end flange;

clamping screws anchored on said connecting part and cooperating directly with a rear surface of said end flange opposite said end surface to press said end surface against said base; and a sealing element interposed between said end flange and said base.

24. A coupling device according to claim 23 wherein said recess is concentric with said outlet; and
said end flange is circular.

25. A coupling device according to claim 23 wherein said connecting part has a quadratic periphery with outwardly and circularly curved corners forming an outwardly arched enlarged area at each of said corners, each of said enlarged areas having a threaded bore receiving one of said clamping screws and positioned relative to said recess such that said peripheral face at said end flange overlaps one of a head and a nut on each of said clamping screws;

said threaded bores are concentric with curvatures of said curved corners; and each of said curved corners has a radius of curvature corresponding essentially to a radius of each said head.

26. A coupling device according to claim 23 wherein said sealing element comprises an O-ring fitted in an annular groove in said end surface of said end flange.

27. A coupling device according to claim 23 wherein said outlet leads to a filter housing of a fluid-technology installation.

28. A coupling device according to claim 23 wherein each said screw comprises a head, a shank extending from said head and a washer mounted on said shank adjacent said head.

* * * * *